April 17, 1928.  
M. M. IRVINE  
1,666,452  
GENERATOR FOR ELECTRIC ARC WELDING  
Filed Feb. 15, 1927   3 Sheets-Sheet 1

April 17, 1928.  
M. M. IRVINE  
1,666,452  
GENERATOR FOR ELECTRIC ARC WELDING  
Filed Feb. 15, 1927  3 Sheets-Sheet 2

Patented Apr. 17, 1928.

1,666,452

UNITED STATES PATENT OFFICE.

MALCOLM MILLER IRVINE, OF GLASGOW, SCOTLAND.

GENERATOR FOR ELECTRIC-ARC WELDING.

Filed February 15, 1927, Serial No. 168,380, and in Great Britain February 19, 1926.

This invention relates to generators for electric arc welding which will be cheaper and more efficient and will give a smoother and better weld with both carbon and metal and other electrodes and particularly with metal electrodes.

A generator according to this invention comprises in combination a field magnet wherein each complete pole is split into two parts, a main part and an auxiliary part, an armature having a winding, with a coil span of about a half the normal pole pitch; means for collecting current generated by the main pole parts only and a shunt or preferably a compound exciting winding on the main pole parts connected across said collecting means.

For a magnet of the two pole variety with split poles, the pitch of the armature winding would be approximately one fourth of the circumference.

The armature must be lap wound and the yoke of the magnet may be, and preferably is, reduced in section between the north pole and the south pole parts so as to increase the magnetic reluctance in the path of the total flux of these poles for the purpose of limiting the variations of this flux.

A practical embodiment of a generator will now be described, simply by way of example, and with reference to the accompanying drawings, in order that the construction and operation of the machine may be clearly understood.

In the drawings:—

Figure 1:
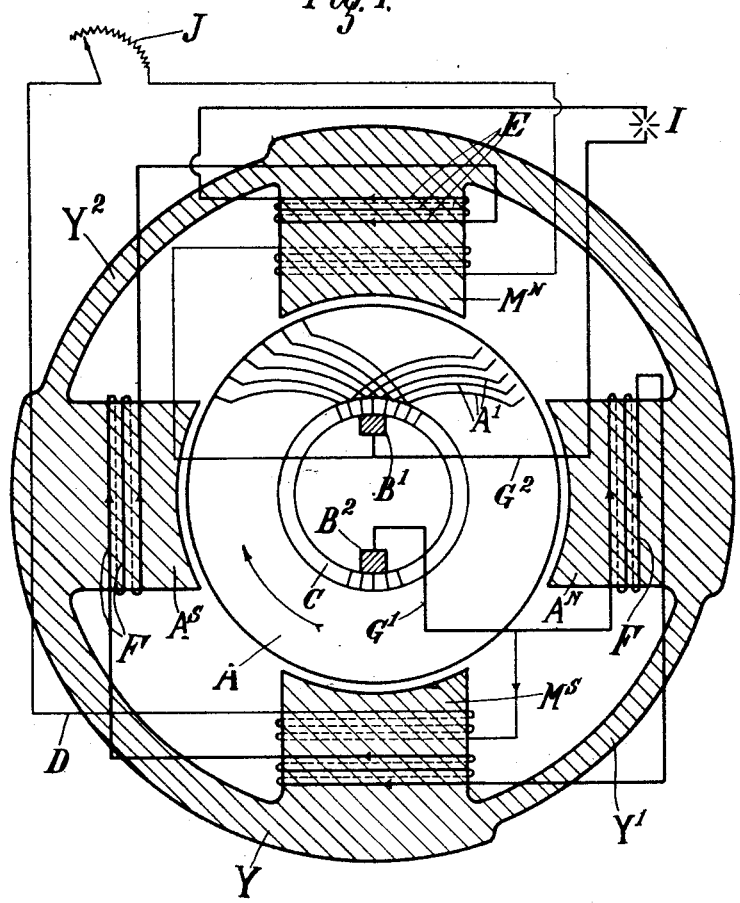
Fig. 1 is a diagrammatic end elevation showing the arrangement of the poles and windings on the machine.
Figure 2:
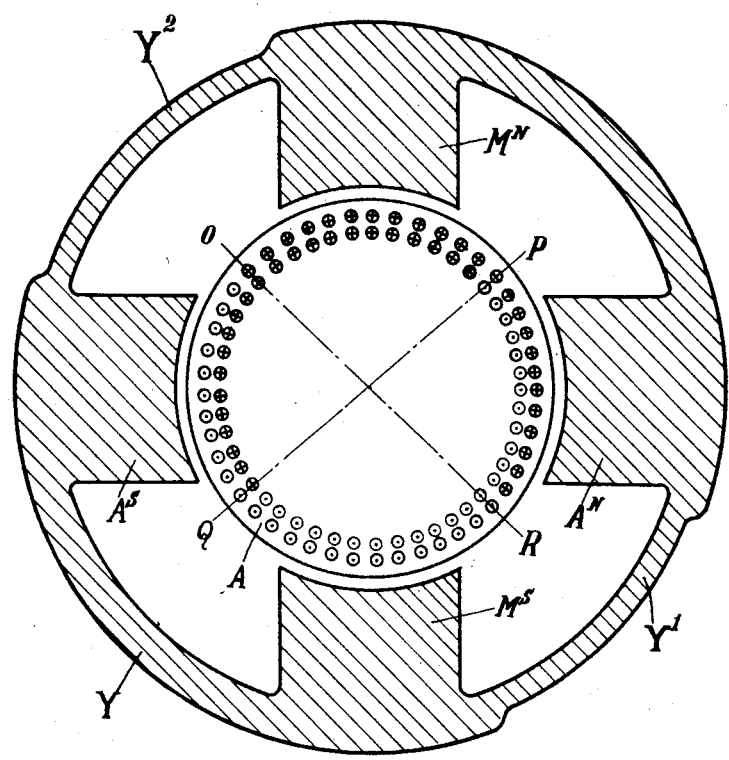
Fig. 2 shows diagrammatically the distribution of the currents in the armature conductors.

The drawings, Figs. 1 and 2, show a two-pole magnet, in which each complete pole is split into two parts, Mn and An of north polarity, and Ms and As of south polarity the two parts being disposed 90° apart around the yoke. For convenience of description one part pole will be hereinafter referred to as the main pole and will be designated Mn, Ms according to whether it is of north or south polarity and the other part pole will be referred to as auxiliary poles and will be designated An, As according to whether it is of north or south polarity while the main and auxiliary part poles of one polarity taken collectively will be hereinafter referred to as complete poles.

The armature A is provided with a lap winding A¹ having a slot span 90° approximately, this winding being connected, as shown, to a commutator C. Brushes B¹ and B² of negative and positive polarity respectively bear on the commutator C at points approximately in line with the centre of the main part poles Mn, Ms. No brushes are provided in line with the auxiliary part poles An, As.

As will be readily understood, the winding being of short span, will result in a distribution of current in the armature conductors somewhat as shown in Fig. 2, that is, in the segments OP and RQ there will be two belts of conductors in which the currents in all the conductors travel in the same direction, say, downwards in the belt OP and upwards in the belt RQ, whereas in the belts OQ and RP currents in the bottom of the slots are opposed to currents in the top of the slots with the result that in the belts OQ and RP the magnetic effects of the currents are neutralized.

It must be understood that the term "belts" is only used for the purpose of facilitating description as referring to those armature conductors which lie within certain zones defined by the chain dotted lines in Fig. 2 and that actually there are no such belts or conductors, the armature being wound in the manner specified.

The particular directions in which the currents travel in Fig. 2 are taken for illustration only as it is obvious that this will depend on the direction of rotation and the polarity of the complete poles.

With the construction described above it is clear that the voltages generated at the brushes B¹ and B² will be dependent on the flux of the main part poles Mn, Ms only and that flux of the auxiliary poles An, As will have no effect in producing voltage at the brushes B¹, B². It will also be clear that the belts of conductors OP and RQ, when carrying current, produce a magnetomotive force which operates directly on the auxiliary part poles An, As, whereas the belts of conductors OQ and RP do not produce any magnetomotive force and therefore will not have any effect on the main part poles Mn, Ms owing to the currents in these conductors neutralizing one another.

A shunt winding D is provided on the main poles Mn, Ms this winding being connected across the brushes B¹, B². Moreover a series winding E also is provided on the main poles (this winding being arranged to assist the shunt winding) and a series winding F is also provided on the auxiliary poles An, As, these series windings being connected in the conductor G¹ as shown, which carries the main current of the machine, the other conductor G² of the main circuit being connected to the arc 1. The windings on the auxiliary poles are arranged to assist the main pole parts Mn, Ms in maintaining the total flux through the complete poles Mn, An and Ms, As or, what is the same thing, through the yoke Y. Since the pole parts Mn and An are in parallel and the pole parts Ms and As are also in parallel any increase of current in the auxiliary pole windings will tend to divert flux from the main pole, thus reducing the voltage of the machine, for, as described above, flux from the auxiliary poles has no effect in altering the voltage appearing at the brushes B¹, B². Further, the armature reaction due to the belts of conductors OP, RQ, assists the series winding on the poles An, As, thereby increasing the drop of pressure at the brushes B¹, B². In order to further assist the poles An, As in deflecting flux from the main poles Mn, Ms the yoke Y of the field magnet may be restricted in section in the regions Y¹—Y² between the complete north pole Mn, An and the complete south pole Ms, As so as to increase the magnetic saturation in this part.

The arrangement of poles and windings described above gives the "drooping characteristic" effect necessary in a welding generator and further the active belts of armature conductors in conjunction with the poles An, As and the series windings thereon provides a choking coil effect which is of great assistance in preventing spluttering at the arc.

To assist in providing this "drooping characteristic" effect, the air gaps under the main part poles Mn, Ms should be smaller than the air gaps under the auxiliary poles An, As and the total ampere turns on the auxiliary pole axis including those due to armature reaction, should be greater than the total ampere turns on the main pole axis.

Figure 3:
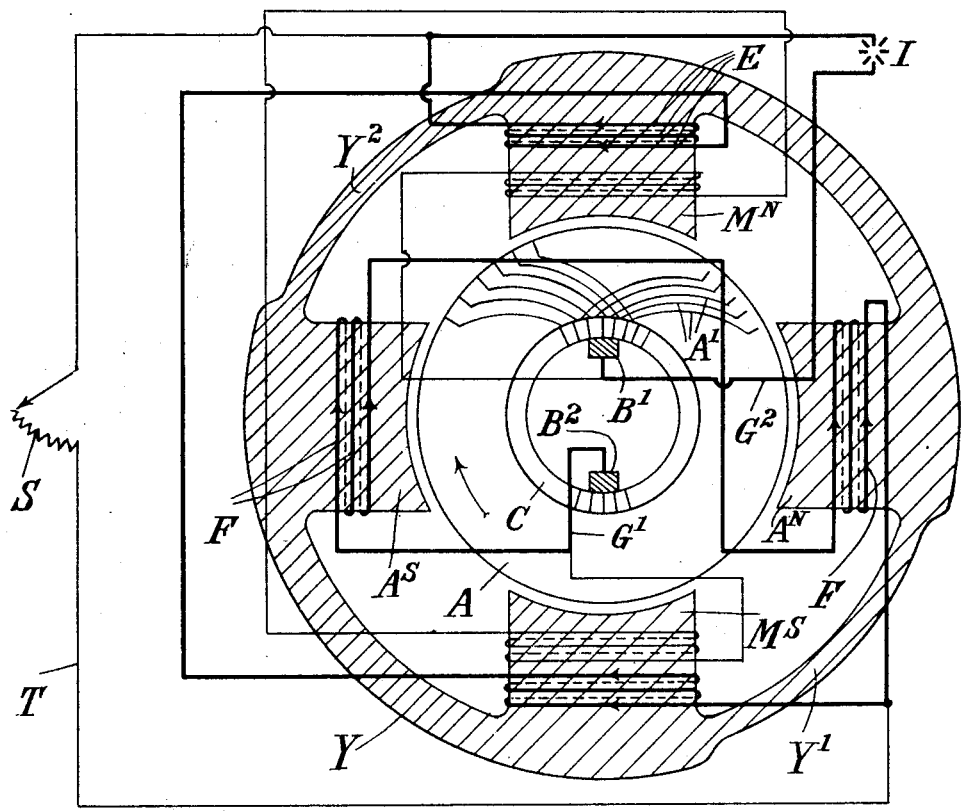
Fig. 3 is a diagrammatic end elevation showing a modification.

In order to vary the current to suit different electrodes I may insert a shunt regulator J in the shunt field circuit D of the main poles Mn, Ms (as shown in Fig. 1). Alternatively as shown in Fig. 3 I may divert a portion of the current past the series coils on the main poles by providing a circuit T containing a regulator S' by which the amount of current diverted can be regulated.

Again I may use a combination of these two methods, the particular method to be used depending on the desired shape of the voltage current characteristic of the machine.

It will be understood that I do not limit myself to the particular arrangement of windings described and illustrated, but I may alter these in any suitable manner to obtain the result desired.

For instance, instead of fitting series coils on the auxiliary poles An, As I may leave these unwound and get the effect of series winding from the armature winding.

It will be understood that by a magnet of the split pole type, is meant a magnet which while acting as an $n$ pole magnet has in reality $2n$ poles, the poles being disposed symmetrically around the machine. Further, the pitch of the armature conductors is defined relatively to the number of effective poles so that the mean pitch will be:—

$$y = \frac{c}{n} \times \tfrac{1}{2};$$

where $c$ is the number of conductors and $n$ is the number of acting poles as above.

I claim:

1. A generator for electric arc welding, comprising, in combination, a field magnet wherein each complete pole is split into two parts, a main part and an auxiliary part; an armature having a winding with a coil span of approximately half the normal pole pitch; means for collecting current generated in the armature winding by the main pole parts only and a shunt winding on the main pole parts connected across said collecting means.

2. A generator for electric arc welding, comprising, in combination, a field magnet wherein each complete pole is split into two parts, a main part and an auxiliary part, an armature having a winding with a coil span of approximately half the normal pole pitch, a commutator with brushes so arranged as to collect current generated by the main pole parts only, a shunt winding on the main pole parts connected across the said brushes, and series windings on the main pole parts assisting the shunt windings.

3. A generator for electric arc welding, comprising, in combination, a field magnet wherein each complete pole is split into two parts, a main part and an auxiliary part, an armature having a winding with a coil span of approximately half the normal pole pitch, a commutator with brushes so arranged as to collect current generated by the main pole parts only, a shunt winding on the main pole parts connected across the said brushes, series windings on the main pole parts assisting the shunt windings and a series winding on the auxiliary part poles so arranged as to assist in maintaining the flux in the complete poles.

4. A generator for electric arc welding comprising, in combination, a magnet of the split pole type, having a yoke reduced in section between the complete pole of one polarity and the complete pole of the opposite polarity, an armature having a winding with a coil span of about a half the normal pole pitch and a shunt exciting winding.

5. A generator for electric arc welding, comprising, in combination, a field magnet having each pole split into two parts, a main part and an auxiliary part, and having a yoke which is reduced in section between the complete pole of one polarity and the complete pole of the opposite polarity, an armature having a winding with a coil span of approximately half the normal pole pitch, a commutator with brushes so arranged as to collect current generated by the main pole parts only, a shunt winding on the main pole parts connected across the said brushes, and series windings on the main pole parts assisting the shunt windings.

6. A generator for electric arc welding comprising, in combination, a magnet of the split pole type having a part pole acting as a main part of one polarity disposed adjacent to a part, acting as an auxiliary part, of the same polarity disposed alternatively with similar parts of opposite polarity and having a yoke reduced in section between complete poles of one polarity and complete poles of opposite polarity so as to increase the magnetic reluctance in the path of the total flux between these poles, an armature, a lap winding having a coil span of approximately half the pitch between a part pole of one polarity and a corresponding part pole of the opposite polarity, a commutator connected to said winding, brushes so disposed and arranged to collect current generated by the main pole parts only, a shunt winding on the main pole parts connected across said brushes and a series winding on the main pole parts assisting the shunt windings.

7. A generator for electric arc welding comprising, in combination, a magnet of the split pole type having a part pole acting as a main part of one polarity disposed adjacent to a part, acting as an auxiliary part, of the same polarity disposed alternatively with similar parts of opposite polarity and having a yoke reduced in section between complete poles of one polarity and complete poles of opposite polarity so as to increase the magnetic reluctance in the path of the total flux between these poles, an armature, a lap winding having a coil span of approximately half the pitch between a part pole of one polarity and a corresponding part pole of the opposite polarity, a commutator connected to said winding, brushes so disposed and arranged to collect current generated by the main pole parts only, a shunt winding on the main pole parts connected across said brushes, a series winding on the main pole parts assisting the shunt windings and a series winding on the auxiliary part pole so arranged as to assist in maintaining the flux through the yoke.

In testimony whereof I affix my signature.

MALCOLM MILLER IRVINE.